United States Patent [19]

Maraschino

[11] Patent Number: 5,169,618
[45] Date of Patent: Dec. 8, 1992

[54] PROCESS FOR PRODUCING HYDROGEN PEROXIDE

[75] Inventor: Mario J. Maraschino, Edmond, Okla.

[73] Assignee: Kerr-McGee Corporation, Oklahoma City, Okla.

[21] Appl. No.: 820,174

[22] Filed: Jan. 13, 1992

[51] Int. Cl.$^5$ .............................................. C01B 15/01
[52] U.S. Cl. .................................................... 423/584
[58] Field of Search ........................................ 423/584

[56] References Cited

U.S. PATENT DOCUMENTS

| | | | |
|---|---|---|---|
| 3,969,201 | 7/1976 | Oloman et al. | 204/83 |
| 4,007,256 | 2/1977 | Kim et al. | 423/584 |
| 4,009,252 | 2/1977 | Izumi et al. | 423/584 |
| 4,118,305 | 10/1978 | Oloman et al. | 204/265 |
| 4,279,883 | 7/1981 | Izumi et al. | 423/584 |
| 4,336,238 | 6/1982 | Dalton, Jr. et al. | 423/584 |
| 4,393,038 | 7/1983 | Sun et al. | 423/584 |
| 4,428,922 | 1/1984 | Hopkins | 423/588 |
| 4,681,751 | 7/1987 | Gosser | 423/584 |
| 4,772,458 | 9/1988 | Gosser et al. | 423/584 |
| 4,832,938 | 5/1989 | Gosser et al. | 423/584 |
| 4,889,705 | 12/1989 | Gosser | 423/584 |
| 5,011,675 | 4/1991 | Haure et al. | 423/659 |
| 5,082,647 | 1/1992 | Chuang | 423/584 |

*Primary Examiner*—Wayne Langel
*Attorney, Agent, or Firm*—Herbert M. Hanegan

[57] ABSTRACT

The present invention provides a novel process for producing hydrogen peroxide. The inventive process utilizes an aqueous liquid reaction medium, a gaseous reactant stream comprising oxygen gas and hydrogen gas, and a catalyst bed comprising a catalyst which is effective for catalyzing the production of hydrogen peroxide from hydrogen and oxygen. The inventive process preferably comprises the step of conducting the gaseous reactant stream and the liquid reaction medium through the fixed catalyst bed in a manner such that a pulse-flow regime is established in the catalyst bed.

32 Claims, No Drawings

PROCESS FOR PRODUCING HYDROGEN PEROXIDE

BACKGROUND OF THE INVENTION

The present invention relates to processes for the direct production of hydrogen peroxide from oxygen and hydrogen.

Hydrogen peroxide is typically produced using a two-stage cyclical anthraquinone process. The two-stage anthraquinone process utilizes a working compound (i.e., anthraquinone) dissolved in at least one organic solvent. In the first stage of the anthraquinone process, the working compound is reacted with hydrogen gas in order to reduce the working compound to its hydrogenated form. The hydrogenation of the working compound is accomplished by (1) mixing hydrogen gas with the working compound solution such that at least a portion of the hydrogen dissolves in the working solution and (2) bringing the resulting solution into contact with an appropriate hydrogenation catalyst. In the second stage of the two-stage anthraquinone process, the hydrogenated working compound is oxidized using oxygen, air, or a suitable oxygen containing compound in order to produce hydrogen peroxide and restore the working compound to its original form. The hydrogen peroxide produced in the oxidation step is typically recovered from the working solution by extraction with water.

Several disadvantageous features of the conventional anthraquinone process contribute greatly to the cost of conducting the process. As indicated above, the anthraquinone process requires the use of a working solution composed of a working compound dissolved in at least one organic solvent. During the oxidation stage of the anthraquinone process, hydrogen peroxide product is formed in this working solution at a concentration of only about 1% by weight. Consequently, in order to obtain a desirable overall hydrogen peroxide production rate, an extremely large amount of working solution must be used. All of this working solution must be purified prior to being reused in the anthraquinone process. Additionally, fresh working compound and fresh solvent must be regularly added to the process system in order to make up for working solution losses.

Hydrogen peroxide can also be produced by directly reacting oxygen gas with hydrogen gas using a batch, or semi-batch, autoclave process. In the autoclave process, the hydrogen gas and oxygen gas reactants are reacted in an aqueous liquid medium and in the presence of a hydrogenation catalyst. During the reaction process, the hydrogenation catalyst is suspended in the aqueous reaction medium by agitation.

Unfortunately, direct production of hydrogen peroxide using the autoclave process does not provide a viable commercial alternative to the conventional anthraquinone process. The rate of hydrogen peroxide production realized in the autoclave process is limited by the extremely slow rate at which the hydrogen gas reactant dissolves in the aqueous liquid reaction medium. The rate at which the hydrogen gas reactant dissolves in the liquid reaction medium is particularly slow when a low hydrogen gas to oxygen gas partial pressure ratio (i.e., a nonexplosive hydrogen gas to oxygen gas partial pressure ratio) is maintained in the autoclave system. Given a hydrogen gas partial pressure of 91 psi, an oxygen gas partial pressure of 909 psi, and a moderate degree of agitation, the autoclave process will yield hydrogen peroxide at a rate of only about 0.4 (gmoles $H_2O_2$)/(hr, liter of solution) or less. Using an extreme degree of agitation, the autoclave process will yield only from about 0.6 to about 1.2 (gmoles $H_2O_2$)/(hr liter of solution). At these low production rates, the total cost of commercially producing a given amount of hydrogen peroxide by the autoclave process would greatly exceed the cost of producing the same amount of hydrogen peroxide using conventional anthraquinone technology.

U.S. Pat. No. 4,336,238 discloses another process wherein hydrogen peroxide is produced by the direct reaction of hydrogen and oxygen. In the process of U.S. Pat. No. 4,336,238, a mixture of hydrogen gas and oxygen gas is contacted with a palladium-on-carbon catalyst in the presence of an acidic, aqueous, liquid reaction medium. The liquid reaction medium contains a large amount (i.e., up to 95% by volume) of an organic solvent. The effective life of the catalyst used in the process of U.S. Pat. No. 4,336,238 is prolonged by continuously removing palladium salts from the liquid reaction medium. These salts are produced during the reaction process as a result of the "solubilization" of the palladium catalyst. The process of U.S. Pat. No. 4,336,238 utilizes a reaction system wherein the liquid reaction medium and the hydrogen gas and oxygen gas reactants are conducted in a plug-flow regime, preferably in an upward direction, through a packed catalyst bed.

The process of U.S. Pat. No. 4,336,238 also fails to provide a viable commercial alternative to the conventional anthraquinone process. The process of U.S. Pat. No. 4,336,238 addresses a common problem experienced in the laboratory when using small scale, fixed bed reaction systems. When using such equipment, a flow system of the type described in U.S. Pat. No. 4,336,238 must typically be employed in order to obtain sufficient liquid holdup and sufficient liquid/catalyst contact for a reaction to occur. However, commercial reaction processes utilizing large scale reaction systems typically are not limited by liquid holdup and/or liquid/catalyst contact. Applicant has determined that, given a large scale fixed bed reaction system and an aqueous liquid reaction medium, the rate at which hydrogen peroxide can be produced by direct reaction of hydrogen gas and oxygen gas is currently limited by the rate at which the hydrogen gas reactant dissolves in the liquid reaction medium.

Several commercial reaction processes utilize trickle-flow reaction systems. Examples of commercial reaction processes utilizing trickle-flow reaction systems include commercial processes for hydrodesulfurization, hydrocracking, hydrotreating, hydrogenation, and oxidation. In a trickle-flow reaction system, a gas/liquid mixture is conducted downwardly through a packed bed in a manner such that the gas and liquid travel through the bed in a trickle-flow regime. In the trickle-flow regime, the liquid component flows, or trickles, through the catalyst in a manner such that the liquid partially wets each catalyst pellet. The gas component, on the other hand, flows downwardly as a continuous phase around the catalyst pellets.

SUMMARY OF THE INVENTION

The present invention provides a process for producing hydrogen peroxide. The process comprises the step of conducting a gaseous reactant stream and a liquid reaction medium through a fixed catalyst bed. The gaseous reactant stream comprises oxygen gas and hydrogen gas. The catalyst bed used in the inventive process comprises a catalyst which is effective for catalyzing the production of hydrogen peroxide from hydrogen and oxygen. The liquid reaction medium preferably comprises water in an amount of at least about 70% by weight based on the total weight of the liquid reaction medium. Further, the gaseous reactant stream and the liquid reaction medium are preferably conducted through the catalyst bed in a pulse-flow regime.

The present invention provides a commercially viable process for the direct production of hydrogen peroxide from hydrogen and oxygen. Through the use of a pulse-flow type reaction system, the present invention provides a hydrogen mass transfer rate (i.e., a hydrogen dissolution rate) which is about an order of magnitude greater than the mass transfer rate provided by the above-described autoclave process. As a result, the present invention provides a hydrogen peroxide production rate of 3 (gmoles $H_2O_2$)/(hr liter of bulk catalyst). Further, in contrast to the conventional anthraquinone process, the inventive process does not require the use of an anthraquinone working solution.

Further objects, features, and advantages of the present invention will be readily apparent to those skilled in the art upon reading the following description of the preferred embodiments.

DESCRIPTION OF THE PREFERRED EMBODIMENTS

As used herein, the term "gaseous reactant stream" refers to the total gaseous stream conducted through the catalyst bed. The gaseous reactant stream is comprised of oxygen and hydrogen. The composition of the gaseous reactant stream is preferably such that a hydrogen partial pressure in the range of from about 50 to about 200 psi and an oxygen partial pressure in the range of from about 0 to about 2000 psi are maintained throughout the catalyst bed. The composition of the gaseous reactant stream is most preferably such that a hydrogen partial pressure in the range of from about 50 to about 100 psi and an oxygen partial pressure in the range of from about 900 to about 2000 psi are maintained throughout the catalyst bed.

Although the gaseous reactant stream preferably consists essentially of hydrogen and oxygen, the gaseous reactant stream can contain nitrogen and/or other inert gases.

The liquid reaction medium used in the inventive process is preferably comprised of water in an amount of at least about 70% by weight based on the total weight of the liquid reaction medium. The liquid reaction medium can also contain an amount of an inhibitor material sufficient to inhibit the decomposition of the hydrogen peroxide product. Examples of suitable inhibitor materials include inorganic acids such as hydrochloric acid, phosphoric acid, sulfuric acid, and perchloric acid. One or more of these acids can be added to the aqueous liquid reaction medium in an amount sufficient to obtain a liquid reaction medium pH in the range of from about 1 to about 6. Acids such as these provide optimum hydrogen peroxide stability when added to the liquid reaction medium in an amount sufficient to obtain a liquid reaction medium pH in the range of from about 3 to about 4.

The liquid reaction medium can also contain an amount of a promoter material sufficient to promote the catalytic production of hydrogen peroxide in the reaction medium. For example, hydrogen peroxide production can be promoted by adding a bromide promoter and an inorganic acid (e.g., hydrochloric acid, phosphoric acid, sulfuric acid, and/or perchloric acid) to the liquid reaction medium in amounts sufficient to provide a Br concentration in the range of from about $1 \times 10^{-7}$M to about 0.1M and a H+ to Br mole ratio of at least about 2:1. Examples of suitable bromide sources include bromic acid and sodium bromide.

Examples of other promoters suitable for use in the present invention include chloride, sulfate, phosphate, perchlorate, nitrite, cyanate, hexafluorosilicate nitrate, thiocyanate, iodide, and combinations thereof.

The catalyst used in the inventive process can generally be any catalyst which (a) is effective for catalyzing the production of hydrogen peroxide from hydrogen and oxygen in an aqueous liquid reaction medium and (b) is capable of being used in a fixed bed reactor system. Conventional catalysts suitable for use in the inventive process typically include a catalytically effective amount of at least one platinum group metal. These catalysts also typically utilize a support material such as silica, hydrous silicic acid, alumina, silica alumina, titanium dioxide, zirconium dioxide, carbon, silicon carbide, diatomaceous earth, clay, or zeolite. Catalysts suitable for use in the present invention and methods of producing these catalysts are disclosed, for example, in U.S. Pat. Nos. 4,009,252, 4,336,238, and 4,832,938, the entire disclosures of which are incorporated herein by reference.

The catalyst used in the inventive process preferably comprises a catalytic material selected from the group consisting of platinum, palladium, and alloys, mixtures, or other combinations comprising platinum and/or palladium. The catalytic material is preferably deposited on a high surface area support to a depth of only a few microns. The catalytic material is also preferably deposited on the support in an amount in the range of from about 0.001% to about 0.10% by weight based on the total weight of the supported catalyst. The catalytic material is most preferably deposited on the support in an amount of about 0.01% by weight based on the total weight of the supported catalyst.

As used herein, the term "high surface area support" refers to a support material having a surface area of at least about 200 m²/g. Particularly preferred support materials are those having surface areas in the range of from about 200 to about 800 m²/g. Examples of preferred support materials include carbon, silica, and alumina.

The catalyst used in the present invention is preferably in pellet form. The catalyst pellets preferably have an average dimension in the range of from about 1/32 inch to about ⅛ inch. Thus, if spherically-shaped pellets are used, the pellets will preferably have an average diameter in the range of from about 1/32 to about ⅛ inch. If, on the other hand, cylindrically-shaped pellets are used, the pellets will preferably have an average height of about D and an average cross-sectional diameter of about D wherein D is a value in the range of from about 1/32 to about ⅛ inch.

The inventive reaction process is preferably conducted at a total pressure in the range of from about 550 to about 2500 psia and a temperature in the range of from about −10° C. to about 50° C. In order to prevent the liquid reaction medium from freezing at −10° C., an amount of liquid reaction medium recycle should be used such that a hydrogen peroxide concentration of at least about 15% by weight is maintained in the liquid reaction medium throughout the reaction system. The inventive reaction process is preferably conducted at a total pressure of about 1000 psia and a temperature in the range of from about 10° C. to about 30° C.

The gaseous reactant stream and the liquid reaction medium can be conducted downwardly through the catalyst bed in a trickle-flow regime. Given a spherically-shaped, 3mm diameter catalyst, a hydrogen partial pressure of 91 psi, and an oxygen partial pressure of 909 psi, the use of a trickle-flow regime will provide a hydrogen peroxide production rate of up to about 0.9 (gmoles $H_2O_2$)/(hr liter of bulk catalyst). In order to provide a commercially desirable alternative to the conventional anthraquinone process, however, the trickle-flow process would have to yield at least about 3.0 (gmoles $H_2O_2$)/(hr liter of bulk catalyst).

In the present invention, a commercially desirable alternative to the conventional anthraquinone process is obtained by conducting the gaseous reactant stream and the liquid reaction medium through the packed catalyst bed in a manner such that a pulse-flow regime is established in the catalyst bed. It is noted that the term "pulse-flow regime" does not refer to a flow system wherein the gas and liquid streams are "pulsed" to the catalyst bed. Rather, as will be understood by those skilled in the art, the gas and liquid streams are fed to the catalyst bed at constant rates whereby pulsation is caused to occur spontaneously and locally within the catalyst bed. Methods for determining gas and liquid flow rates necessary to establish a pulse-flow regime within a given catalyst bed are discussed, for example, in an article by G. Tosun appearing in *Industrial Engineering Chemistry Process Design and Development*, 1984, Vol. 23, pages 29–35, the entire disclosure of which is incorporated herein by reference.

Given a vertical, packed catalyst bed composed of catalyst pellets having an average dimension in the range of from about 1/32 to about ⅛ inch, a pulse-flow regime is preferably established in the catalyst bed in accordance with the present invention by (a) conducting the liquid reaction medium downwardly through the horizontal cross-section of the catalyst bed at a liquid rate ($R_L$) in the range of from about 6 to about 24 kg/m²sec and (b) conducting the gaseous reactant stream downwardly through the catalyst bed in a manner such that $$\frac{(R_G)(\rho_L)^{0.5}}{(\rho_G)^{0.5}} = X$$

wherein: $R_0$ is the rate of flow of the gaseous reactant stream through the horizonal cross-section of the catalyst bed expressed in kg/m²sec; $\rho_L$ is the density of the liquid reaction medium; $\rho_G$ is the density of the gaseous reactant stream expressed in the same units as $\rho_L$; and X is a value in the range of from about 3 to about 12 kg/m²sec. Most preferably: the catalyst used in the inventive process is a spherically-shaped or cylindrically-shaped catalyst having an average dimension of about 3mm; the liquid reaction medium is conducted through the catalyst bed at a rate of about 12.4 kg/m²sec, and X=about 6.2 kg/m²sec.

In the inventive process, the material exiting the catalyst bed will be comprised of: (a) a gaseous phase comprised of gaseous reactants which did not dissolve in the liquid reaction medium as the gaseous reactant stream and the liquid reaction medium were conducted through the fixed catalyst bed and (b) a liquid phase comprised of the hydrogen peroxide product produced during the process and the liquid reaction medium, said hydrogen peroxide product being dissolved in the liquid reaction medium.

Due to the exothermic nature of the chemical reaction involved in the inventive process, a temperature rise occurs across the fixed catalyst bed as the gaseous reactant stream and the liquid reaction medium are conducted therethrough. Thus, the temperature of the effluent material exiting the catalyst bed is greater than the equilibrium temperature of the material entering the catalyst bed.

A portion of the liquid phase exiting the catalyst bed and at least a portion of the gaseous phase exiting the catalyst bed are preferably recycled through the catalyst bed. The amount of gaseous effluent recycled through the catalyst bed is preferably an amount sufficient to ensure that the value of X, as defined above, is in the range of from about 3 to about 12 kg/m²sec. The amount of gaseous effluent recycle is most preferably an amount sufficient to ensure that $X/R_L$=about 0.5, wherein X and $R_L$ are as defined hereinabove. The amount of liquid effluent recycled through the catalyst bed is preferably an amount sufficient to maintain a hydrogen peroxide concentration in the reactor effluent liquid phase of from about 10% to about 30% by weight based on the total weight of the reactor effluent liquid phase. The liquid effluent recycle stream is cooled as necessary prior to being returned to the reaction system in order to (a) remove exothermic heat from the reaction system and (b) ensure that a desired temperature profile is maintained across the catalyst bed.

The structure of the reaction system apparatus used for conducting the inventive method can generally be the same as that which is commonly used in trickle flow reaction systems. As mentioned above, trickle flow reactor systems are used, for example, in processes for hydrodesulfurization, hydrocracking, hydrotreating, hydrogenation, and oxidation. As is well known in the art, such reactor systems typically utilize one or more vertical reactor vessels, each reactor vessel containing a packed catalyst bed. The top of each reactor vessel is commonly fitted with an internal liquid distributor and a gas delivery manifold. The bottom of each reaction vessel typically provides sufficient space, internals, and connections for gas/liquid phase separation, gas draw-off, and liquid drawoff. The reactor system will also typically include appropriate equipment (i.e., pumps, compressors, piping, indirect heat exchangers, etc.) for recycling gaseous and/or liquid reactor effluent streams through the reactor vessel(s). Methods for recovering the hydrogen peroxide product from the reactor liquid effluent stream will be readily apparent to those skilled in the art. The particular product recovery method(s) used in a given situation will depend, for example, upon the exact nature of the aqueous liquid reaction medium used, the degree of product purity required, and the desired end use of the hydrogen peroxide product. Depending on the specific nature of the aqueous liquid reaction medium used, the liquid reactor effluent can oftentimes be used directly as an oxidizing solution. If necessary, however, a very pure hydrogen peroxide product can be recovered by distillation. Alternatively, or in addition, hydrochloric acid, nitric acid, and many other impurities can be removed from the liquid reaction effluent through the use of ion exchange resins.

The following example is provided in order to further illustrate the inventive hydrogen peroxide production method.

EXAMPLE 567 pounds per hour of fresh hydrogen gas, 7872 pounds per hour of fresh oxygen gas, and 25,161 pounds per hour of liquid water are conducted to a fixed catalyst bed reactor system. Each of these streams is conducted to the reaction system at a pressure of 1000 psia. The water stream has a temperature of 24° C. while each of the gaseous streams has a temperature of 60° C.

The fixed catalyst bed reactor system is composed of two parallel, vertical reactor vessels. Each reactor vessel has an internal diameter of 10 feet and contains a 6 foot deep fixed catalyst bed. When in operation, each catalyst bed has an inlet pressure of 1000 psia, an inlet temperature of about 10° C., and an outlet temperature of about 20° C. The effluent from the reactor system consists of a gaseous effluent phase and a liquid effluent phase. The liquid effluent phase is composed of 79.8% by weight water, 20.0% by weight hydrogen peroxide, and 0.2% by weight dissolved gas.

151 pounds per hour of the gaseous reactor effluent stream is purged from the reaction system. The remainder of the gaseous reactor effluent is compressed to 1000 psia and is combined with the fresh oxygen and hydrogen streams mentioned above. The compressed gaseous reactor effluent has a hydrogen partial pressure of 91 psia and an oxygen partial pressure of 909 psia. The mixture formed by combining the compressed gaseous reactor effluent with the fresh oxygen and hydrogen streams is referred to in the remainder of this example as "the gaseous reactant stream".

After being cooled from a temperature of 20° C. to a temperature of about 10° C., 1,583,000 pounds per hour of the liquid reactor effluent are combined with the liquid water stream mentioned above. The resulting mixture, which is referred to in the remainder of this example as "the liquid reaction medium", is composed of 80.1% by weight water, 19.7% by weight hydrogen peroxide, and 0.2% by weight dissolved gases.

The catalyst used in each of the above-mentioned catalyst beds is composed of palladium deposited on a carbon support. The carbon support material has a surface area of about 600 m²/g. The palladium is deposited on the carbon support in an amount of about 0.01% by weight, based on the total weight of the supported catalyst, and to a depth of only a few microns. The supported catalyst consists of spherically-shaped pellets having an average diameter of about 3mm.

One-half of the gaseous reactant stream and one-half of the liquid reaction medium are fed to the top of one of the reaction vessels. The remainder of the gaseous reactant stream and the remainder of liquid reaction medium are fed to the top of the other reaction vessel. As a result, the liquid reaction medium flows downwardly through each catalyst bed at a rate of about 12.4 kg/m²sec and the gaseous reactant stream flows downwardly through each catalyst bed at a rate such that $$\frac{(\text{Gas Rate, kg/m}^2\text{sec}) \ (\text{Liquid Density})^{0.5}}{(\text{Gas Density})^{0.5}} = \text{About 6.2 kg/m}^2\text{sec}$$

Consequently, a downward pulse-flow regime is established in each catalyst bed.

33,443 pounds per hour of the liquid reactor effluent are withdrawn from the reactor system. This liquid material is either used directly as an oxidizing solution or conducted to downstream peroxide recovery and/or purification systems.

The inventive process described in this example consumes hydrogen gas feed at a rate of about 4.2 (gmoles)/(hr liter of bulk catalyst) and provides a hydrogen peroxide production rate of about 3 (gmoles)/(hr liter of bulk catalyst) with a peroxide product selectivity of about 71%. The reaction system and process described in this example will produce about 45 million pounds of hydrogen peroxide per year.

Thus, the present invention is well adapted to carry out the objects and obtain the ends and advantages mentioned above as well as those inherent therein. While numerous changes may be made by those skilled in the art, such changes are encompassed within the scope of the invention as defined by the appended claims.

I claim:

1. A process for producing hydrogen peroxide comprising the step of conducting a gaseous reactant stream and a liquid reaction medium through a fixed catalyst bed, said gaseous reactant stream comprising oxygen gas and hydrogen gas, said liquid reaction medium comprising water in an amount of at least about 70% by weight based on the total weight of said liquid reaction medium, and said catalyst bed comprising a catalyst which is effective for catalyzing the production of hydrogen peroxide from hydrogen and oxygen, wherein said gaseous reactant stream and said liquid reaction medium are conducted through said catalyst bed at substantially constant rates such that a pulse-flow regime is spontaneously established within said catalyst bed.

2. The process of claim 1 wherein said gaseous reactant stream and said liquid reaction medium are conducted downwardly through said catalyst bed.

3. The process of claim 1 wherein the partial pressure of hydrogen in said catalyst bed is in the range of from about 50 to about 200 psi.

4. The process of calim 1 wherein the partial pressure of hydrogen in said catalyst bed is in the range of from about 50 to about 100 psi.

5. The process of claim 1 wherein the partial pressure of oxygen in said catalyst bed is in the range of form about 500 to about 2000 psi.

6. The process of claim 1 wherein the partial pressure of oxygen in said catalyst bed is in the range of form about 900 to about 2000 psi.

7. The process of claim 1 wherein the partial pressure of hydrogen in said catalyst bed is in the range of from about 50 to 200 psi, and the partial pressure of oxygen in said catalyst bed is in the range of from about 500 to about 2000 psi.

8. The process of claim 1 wherein said liquid reaction medium further comprises an amount of an inhibitor sufficient to inhibit the decomposition of hydrogen peroxide.

9. The process of claim 8 wherein said inhibitor is an inorganic acid.

10. The process of claim 9 wherein said inorganic acid is present in said liquid reaction medium in an amount sufficient to provide a liquid reaction medium pH in the range of from about 3 to about 4.

11. The process of claim 1 wherein said liquid reaction medium further comprises an amount of promoter material sufficient to promote the formation of hydrogen peroxide.

12. The process of claim 11 wherein said promoter material is selected from the group consisting of bromide, chloride, sulfate, phosphate, perchlorate, nitrate, cyanate, hexafluorosilicate nitrate, thiocyanate, iodide, and combinations thereof.

13. The process of claim 1 wherein said catalyst comprises a catalytic material selected from the group consisting of platinum, palladium, and alloys, mixtures or other combinations comprising at least one of these materials.

14. The process of claim 13 wherein said catalyst further comprises a support having a surface area in the range of from about 200 to about 800 m²/g.

15. The process of claim 14 wherein said support is selected from the group consisting of carbon, silica, and alumina.

16. The process of claim 1 wherein:
said catalyst is comprised of pellets having an average dimension in the range of from about 1/32 to about ⅛ inch;
said liquid reaction medium is conducted downwardly through said fixed catalyst bed at a rate in the range of from about 6 to about 24 kg/m²sec; and
said gaseous reactant stream is conducted downwardly through said fixed catalyst bed at a rate such that $$\frac{(R_G)(\rho_L)^{0.5}}{(\rho_G)^{0.5}} = X$$

wherein: $R_G$ is the rate of flow of said gaseous reactant stream through said fixed catalyst bed expressed in kg/m²sec; $\rho_L$ is the density of said liquid reaction medium; $\sigma_G$ is the density of said gaseous reactant steam expressed in the same units as $\sigma_L$; and X is a value in the range of from about 3 to about 12 kg/m²sec.

17. The process of calim 16 wherein said catalyst has an average dimension of about 3 mm, said liquid reaction medium is conducted through said fixed catalyst bed at a rate of about 12.4 kg/m²sec, and X=about 6.2 kg/m²sec.

18. The process of claim 1 further comprising the step of recycling unreacted oxygen gas and unreacted hydrogen gas for reuse in said step of conducting.

19. The process of claim 1 further comprising the step of recycling at least a portion of said liquid reaction medium for reuse in said step of conducting.

20. A process for producing hydrogen peroxide comprising the step of conducting a gaseous reactant stream and a liquid reaction medium through a fixed catalyst bed, said gaseous reactant stream comprising oxygen gas and hydrogen gas and said catalyst bed comprising a catalyst which is effective for catalyzing the production of hydrogen peroxide from hydrogen and oxygen, wherein said gaseous reaction stream and said liquid reaction medium are conducted through said catalyst bed at substantially constant rates such that a pulse-flow regime is spontaneously established within said catalyst bed.

21. The process of claim 20 wherein the partial pressure of hydrogen in said catalyst bed is in the range of from about 50 to about 200 psi.

22. The process of claim 20 wherein the partial pressure of hydrogen in said catalyst bed is in the range of from about 50 to about 100 psi.

23. The process of claim 20 wherein the partial pressure of oxygen in said catalyst bed is in the range of from about 500 to about 2000 psi.

24. The process of claim 20 wherein the partial pressure of oxygen in said catalyst bed is in the range of from about 900 to about 2000 psi.

25. The process of claim 20 wherein the partial pressure of hydrogen in said catalyst bed is in the range of from about 50 to about 200 psi and the partial pressure of oxygen in said catalyst bed is in the range of from about 500 to about 2000 psi.

26. The process of claim 20 wherein said catalyst comprises a catalytic material selected from the group consisting of platinum, palladium, and alloys, mixtures or other combinations comprising at least one of these materials.

27. The process of claim 26 wherein said catalyst further comprises a support having a surface area in the range of from about 200 to about 800 m²/g.

28. The process of claim 27 wherein said support is selected from the group consisting of carbon, silica, and alumina.

29. The process of claim 20 wherein:
said catalyst is comprised of pellets having an average dimension in the range of from about 1/32 to about ⅛ inch;
said liquid reaction medium is conducted downwardly through said fixed catalyst bed at a rate in the range of from about 6 to about 24 kg/m²sec; and
said gaseous reactant stream is conducted downwardly through said fixed catalyst bed at a rate such that $$\frac{(R_G)(\rho_L)^{0.5}}{(\rho_G)^{0.5}} = X$$

wherein: $R_G$ is the rate of flow of said gaseous reactant stream through said fixed catalyst bed expressed in kg/m²sec; $\rho_L$ is the density of said liquid reaction medium; $\rho_G$ is the density of said gaseous reactant steam expressed in the same units as $\rho_L$; and X is a value in the range of from about 3 to about 12 kg/m²sec.

30. The process of claim 29 wherein said catalyst has an average dimension of about 3 mm, said liquid reaction medium is conducted through said fixed catalyst bed at a rate of about 12.4 kg/m²sec, and X=about 6.2 kg/m²sec.

31. The process of claim 20 further comprising the step of recycling unreacted oxygen gas and unreacted hydrogen gas for reuse in said step of conducting.

32. The process of claim 20 further comprising the step of recycling at least a portion of said liquid reaction medium for reuse in said step of conducting.

* * * * *

UNITED STATES PATENT AND TRADEMARK OFFICE
CERTIFICATE OF CORRECTION

PATENT NO. : 5,169,618
DATED : December 8, 1992
INVENTOR(S) : Mario J. Maraschino It is certified that error appears in the above-indentified patent and that said Letters Patent is hereby corrected as shown below:

Column 9, line 39, delete "$\sigma_G$" and insert --$\rho_G$--

Column 9, line 41, delete "$\sigma_L$" and insert --$\rho_L$--

Signed and Sealed this

Twenty-first Day of October 1997

Attest:

BRUCE LEHMAN

*Attesting Officer*  *Commissioner of Patents and Trademarks*